United States Patent Office 3,331,356
Patented July 18, 1967

3,331,356
STERILIZATION OF FISH IN THEIR AQUATIC ENVIRONMENT TO PRODUCE MAXIMUM SIZE AND WEIGHT PER UNIT OF WATER SURFACE
Benjamin Eckstein, Jerusalem, Israel, assignor to the United States of America as represented by the Secretary of the Interior
No Drawing. Filed Nov. 22, 1965, Ser. No. 519,820
9 Claims. (Cl. 119—3)

This invention relates to a method for sterilizing fish, especially Tilapia. In particular, the method comprises the gonadal destruction of Tilapia fry at an age of about four to eight weeks by introducing into water containing the fry an estrogenic composition in small concentrations.

Various species of Tilapia have been cultivated for many years and provide a supply of animal protein. The fish grow under crowded conditions in many habitats, including fresh and brackish waters having a temperature of at least 55 degrees Fahrenheit. It feeds directly on algae, plankton, and primary aquatic vegetation, and constitutes a two-step process in the production of human food from inorganic fertilizers on fodder. Therefore, it is an excellent fish for pond cultivation, and considerable work has been done in studying Tilapia culture throughout the world.

The Tilapia easily qualifies for pond-culture in terms of the first criterion of this branch of animal husbandry, which is the weight of fish that can be grown per unit of pond surface, sometimes called the maximum standing crop. The crop can be made several times larger by fertilizing the water, which increases the primary plant production. Supplementary fodder can also be added to increase the crop.

Ordinarily in areas where the culture of fish in ponds or other aquatic environment, is established the fish are bred and raised to fingerling size in one pond and transferred to another pond for feeding up to the optimum size for marketing or eating. The second pond can be stocked with a known quantity of fish below the maximum standing crops. By addition of fertilizer and fodder these fish can be raised at the maximum growth rate and harvested.

Most species of fish cultured in ponds do not breed in the raising ponds where they are placed after reaching fingerling size, at least not until they have reached an acceptable size. Tilapia, however, become mature and start to breed when they are quite small, at a weight of an ounce or less. As a result the ponds become overcrowded with fish of a commercially-unacceptable size, which compete for food available in the pond with the older fish. The maximum standing crop is soon attained by the proliferation of fry and fingerlings, which continue to breed at a small size at frequent intervals. Also, the Tilapia female mouth breeds by taking the fertilized eggs into her mouth and orally incubating the young. The eggs are hatched for about five days and remain for another five days atfer hatching. Thus a high survival rate among the young fry is attained by the Tilapia.

It has been discovered that substantial yields of large Tilapia can be obtained by sterilizing the fry before reaching maturity. When the aquatic habitat of the Tilapia fry is treated with a small concentration of estrogens, such as diethylstilbestrol or its diphosphate, at the stage in the Tilapia growth cycle preceding gonadal differentiation and continuing the treatment for a few weeks thereafter, gonadal destruction is achieved so as to prevent subsequent proliferation. A unique sterile fry is produced, which grows to a large size since no offspring are present in the raising ponds to compete with the sterile fry for the food supply.

Accordingly, it is an object of this invention to provide a novel process for treating fish to produce gonadal destruction, and to provide a unique variety of Tilapia fry which are incapable of reproduction. It is a further object of this invention to provide a method for treating water containing fish with an estrogenic composition, such as stilbestrol and its derivatives, at a concentration sufficient to cause gonadal destruction in the fry of the fish at the stage of growth in which gonadal differentiation takes place in the particular species being treated. These and other objects and features of the present invention will be seen from the following description.

The cultivation of *Tilapia aurea*, a fish native to the fresh waters of Africa and the Jordan Valley, has been tried as a source of animal protein, especially in those parts of the world where the human population suffers from protein deficiency. This species is typical of the Tilapia genus in that it reproduces at a small size, as a result of which a large part of a pond-raised *Tilapia aurea* crop is of such size as to be practically without value.

The genus Tilapiae is a member of the Cichlidae family and is similar to the American sunfishes. The various species of Tilapia, such as *Tilapia mossambica*, *Tilapia macrochir*, *Tilapia melanopleura*, *Tilapia nilotica*, *Tilapia zilli*, and *Tilapia aurea*, are all susceptible to treatment by the new method, and these species have a propensity to start breeding at a small size. The examples given for *Tilapia aurea* are given to demonstrate the method only, and it is to be understood that the method may be used to control the population and breeding of the genus Tilapiae as well as other members of the Cichlidae family or other fishes that tend to reproduce at a small size.

A variety of estrogenic compositions may be used in the novel process to produce gonadal destruction. The stilbene-type compounds are known for their effects on the reproductive organs of various animals, and of these the hydroxy-substituted stilbene compounds such as stilbestrol and its derivatives are suitable for use in this invention. Of particular interest is the property of diethyl stilbestrol $(HOC_6H_4C[C_2H_5]:C[C_2H_5]C_6H_4OH$; 3,4-bis [para-hydroxyphenyl]-3-hexene) and diethylstilbestrol diphosphate (alpha, alpha-diethyl-4,4'-stilbenediol diphosphate) which destroys the gonads of one to two-month-old fry at the stage of their growth preceding gonadal differentiation.

*Example*

To water at ambient temperature containing 4 to 5-week-old *Tilapia aurea* specimens was added diethylstilbestrol diphosphate as an aqueous solution sufficient to maintain a concentration of the estrogen of about 50 to 200 micrograms per liter of water. After about 2 weeks the first signs of gonadal destruction became manifest, and after about 4 weeks only the peritoneal lining of the gonads persisted. It was found that concentrations of the estrogens substantially above 200 micrograms per liter did not achieve the desired results; however, the concentration must be adjusted to the particular estrogenic composition employed.

It was concluded that the optimum time of treatment was three weeks when the fry were at an age between about 4 and 8 weeks. In most instances the estrogenic composition caused an elimination of all the germinal and stromal cells and left only the peritoneal lining. The treatment may be extended to four weeks or more, but there is no advantage to maintaining these conditions past the period when substantial gonadal destruction takes place.

The form in which the estrogens are added to the water is not important, so long as the estrogen is watermiscible. For instance, diethylstilbestrol or such derivatives as its dipropionate are only slightly soluble in water. Other hormones were added as an alcoholic solution to the aquatic habitat to be treated; and dispersions of the estrogens could be utilized. Diethylstilbestrol disphosphate is preferred because of its solubility in water.

The temperature of the treated aquatic environment does not appear to be critical; although increased activity would be expected at relatively higher temperatures.

The invention has been illustrated by specific examples but there is no intent to limit the invention to the specific details so disclosed, except insofar as set forth in the following claims.

What is claimed is:

1. A method for controlling population and breeding of fish to produce substantial yields of large fish comprising maintaining in aquatic environments containing the fish a concentration of estrogenic composition sufficient to effect substantial gonadal destruction in the fish whereby the fish obtain mature growth without over populating the aquatic environment.

2. A method for producing sterile fry of Tilapia to produce substantial yields of large fish which comprises treating water containing young Tilapia with an estrogenic composition comprising a stilbene-type compound at a concentration and for a period of time sufficient to cause substantial gonadal destruction in the fry whereby the fry obtain mature growth without over populating the aquatic environment.

3. A method according to claim 2 wherein the estrogenic composition comprises diethylstilbestrol diphosphate in a concentration of about 50 to 200 micrograms per liter of water during at least two weeks when the fry are between about four weeks and eight weeks old.

4. A method according to claim 3 wherein the water containing the Tilapia is treated during the period when the fry are about four to seven weeks old.

5. A method according to claim 3 wherein *Tilapia aurea* are sterilized.

6. Sterile fish produced by the method of claim 1.

7. Sterile Tilapia produced by the method of claim 2.

8. Sterile Tilapia produced by the method of claim 3.

9. Sterile *Tilapia aurea* produced by the method of claim 3.

References Cited

UNITED STATES PATENTS

| | | | |
|---|---|---|---|
| 2,802,854 | 8/1957 | Arnold | 260—974 |
| 2,828,244 | 3/1958 | Fonner et al. | 167—65 |
| 3,060,085 | 10/1962 | Frensch et al. | 167—46 |
| 3,158,135 | 11/1964 | Kimmerle | 119—3 |
| 3,306,256 | 2/1967 | Lewis | 119—3 |

OTHER REFERENCES

Merck Index: Merck and Company, Rahway, N.J., page 355.

ALDRICH F. MEDBERY, *Primary Examiner.*

SAMUEL KOREN, *Assistant Examiner.*